United States Patent
Bigman et al.

(10) Patent No.: US 10,162,597 B1
(45) Date of Patent: Dec. 25, 2018

(54) IDENTIFYING IO ACCESS PATTERN IN UNIQUE DATABASE STRUCTURES

(75) Inventors: Ron Bigman, Holon (IL); Adi Hirschtein, Givataim (IL); Nir Sela, Tzur Igal (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 881 days.

(21) Appl. No.: 13/610,214

(22) Filed: Sep. 11, 2012

(51) Int. Cl.
*G06F 7/00* (2006.01)
*G06F 17/30* (2006.01)

(52) U.S. Cl.
CPC ............... *G06F 7/00* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 7,818,348 | B2 * | 10/2010 | Dettinger et al. | 707/799 |
| 8,555,018 | B1 * | 10/2013 | Rohr et al. | 711/165 |
| 8,555,108 | B2 * | 10/2013 | Soran et al. | 714/6.1 |
| 2006/0288025 | A1 * | 12/2006 | Kumar et al. | 707/101 |
| 2007/0266037 | A1 * | 11/2007 | Terry et al. | 707/100 |
| 2008/0208820 | A1 * | 8/2008 | Usey et al. | 707/3 |
| 2009/0055638 | A1 * | 2/2009 | Nakano et al. | 713/1 |
| 2009/0319474 | A1 * | 12/2009 | Bestgen et al. | 707/2 |
| 2010/0161556 | A1 * | 6/2010 | Anderson et al. | 707/638 |
| 2010/0332526 | A1 * | 12/2010 | Nori et al. | 707/769 |
| 2013/0290598 | A1 * | 10/2013 | Fiske et al. | 711/103 |

* cited by examiner

*Primary Examiner* — Tuan A Pham
(74) *Attorney, Agent, or Firm* — Anderson Gorecki LLP (57) ABSTRACT

Certain database structures and operations are recognized in order to generate hints for a tiered storage array. Historical snapshots of a database data dictionary are searched for patterns corresponding to the structures and operations. After a structure or operation is identified, a corresponding set of extents is identified. Logic predicts future activity associated with the extents, and a corresponding hint is provided to the storage array. Statistical information associated with the identified structure or operation may be maintained and updated to facilitate prediction of activity.

18 Claims, 8 Drawing Sheets

IDENTIFYING IO ACCESS PATTERN IN UNIQUE DATABASE STRUCTURES

CROSS-REFERENCE TO RELATED APPLICATIONS

NA

BACKGROUND OF THE INVENTION

The invention is generally related to data storage subsystems which are accessed via a network, and more particularly to tiered storage.

Enterprise data storage subsystems are used to maintain relatively large data sets. A data storage subsystem includes at least one enterprise storage array which is accessed via a host device. The storage array typically includes multiple physical storage devices, and technologies such as RAID and remote site mirroring may be used to help avoid data loss. Further, tiered levels of storage may be utilized in order to help provide both high performance and high capacity at a practical cost. Applications and devices generally access data in a storage array by sending IOs to the host device. The host device then communicates with the storage array to Read or Write data. If storage resources are organized in hierarchical tiers, data is moved between storage tiers based on IO activity. For example, data may be moved to a lower storage tier as a function of not being accessed for some period of time, or to a higher storage tier as a function of recently being accessed. Generally, data which has been recently accessed is moved to a higher storage tier characterized by faster access time, whereas data that has not been accessed for some period of time may be moved to a lower storage tier characterized by slower access time.

SUMMARY OF THE INVENTION

In accordance with an aspect, a computer program stored on a non-transitory computer readable medium comprises: logic which identifies a defined database structure or operation; logic which identifies a set of extents which correspond to the identified structure or operation; and logic which predicts activity associated with the identified extents and provides a corresponding hint to a storage array.

In accordance with another aspect, an apparatus comprises: a network device in communication with a storage array, the network device including non-transitory computer-readable memory and processing hardware for storing and operating logic which: identifies a defined database structure or operation; identifies a set of extents which correspond to the identified structure or operation; and predicts activity associated with the identified extents and provides a corresponding hint to the storage array.

An advantage associated with aspects is that hints can be generated in association with certain database structures and operations in order to facilitate automatic tiering. This can help a storage array to move data that is about to be active/hot before it actually becomes active/hot even if this data has not been used in any process.

Other features and advantages will become apparent in view of the detailed description and figures.

DETAILED DESCRIPTION

Certain aspects of the invention including but not limited to steps shown in flow diagrams may be implemented at least in-part with a computer program stored on non-transitory memory. The computer program is utilized by a physical processor device and possibly interfaces, transmitters, receivers and other hardware components in order to achieve the described functionality. The computer program may be distributed among multiple devices or operate on a single device.

Figure 1:
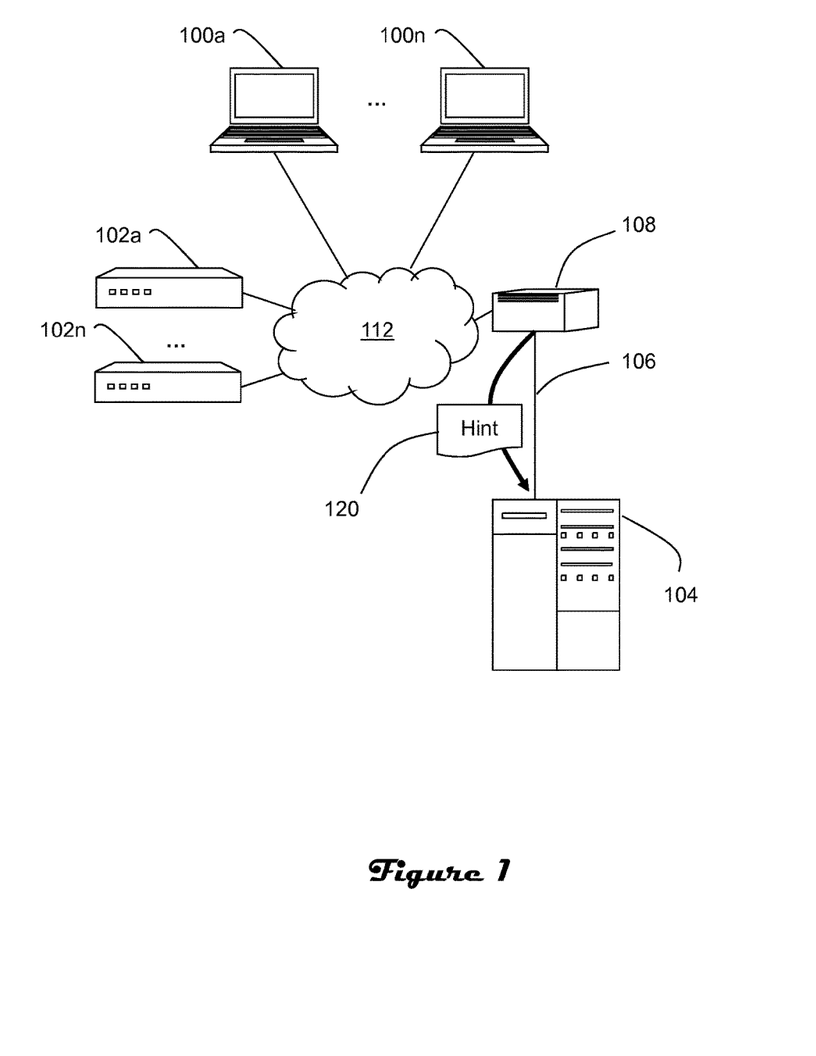
FIG. 1 illustrates a simplified enterprise network environment.

FIG. 1 illustrates a simplified network environment in which applications running on devices such as user terminals $100a$ through $100n$ (including but not limited to personal computing devices of any kind) and servers $102a$ through $102n$ (including but not limited to computing devices of any kind which perform tasks for other devices) utilize data maintained by the data storage resources of a data storage subsystem. The data storage subsystem may include an enterprise storage array 104, such as the Symmetrix system of EMC corporation, and a host device 108, which may be a type of server.

Figure 2:
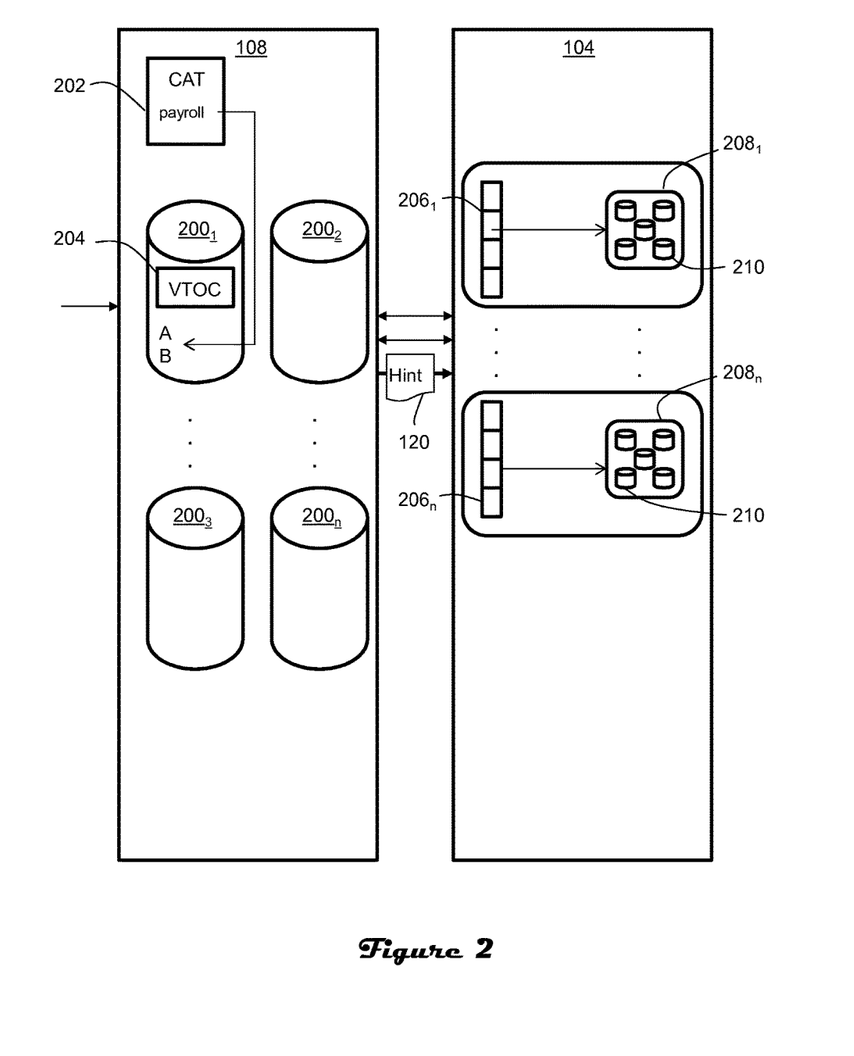
FIG. 2 illustrates a data storage subsystem.

Referring to FIG. 2, the host device 108 includes a plurality of logical volumes $200_1$ through $200_n$. A catalog 202 maintains pointers to data stored on the logical volumes. For example, a catalog entry might indicate that a file "payroll" is located on volume $200_1$ at address range A-B. Each logical volume includes a volume table of contents (VTOC) 204 which indicates a corresponding cylinder and track at which the file is located from the perspective of the host device. However, the actual data is stored by physical storage devices associated with the storage array 104 at locations which may not be known by the host, e.g., at locations other than those specified by the VTOC. The storage array 104 functions to maintain data and perform IOs in response to signaling from the host device 108. For example, if the host device receives a Read request for a set of data, the host device relays that Read request to the storage array in a format that can be processed by the storage array. The storage array then provides the data associated with the Read request to the host device, and the host device returns the data to the device which generated the Read request. In the case of a Write request the host device updates a corresponding logical volume and provides the data associated with the Write request to the storage array for storage on a physical device.

In accordance with current trends in storage system development, the storage array 104 may be thinly provisioned such that the apparent storage capacity does not necessarily match the actual storage capacity. The thinly provisioned storage array includes pointer tables $206_1$ through $206_n$ associated with storage pools $208_1$ through $208_n$ of logical volumes 210 which are associated with physical storage devices (not illustrated). In response to an IO such as a READ or WRITE from the host 108 which indicates a location from a VTOC, the storage array 104 looks for a pointer entry in the table, e.g., $206_1$, associated with the address indicated by the IO. The pointer indicates a corresponding address for the data in a data pool, e.g., $208_1$. The READ or WRITE is then performed. If the IO is a WRITE and no pointer is found, storage space is allocated in a data pool and a new pointer entry is made in the table pointing to the allocated space.

Figure 3:
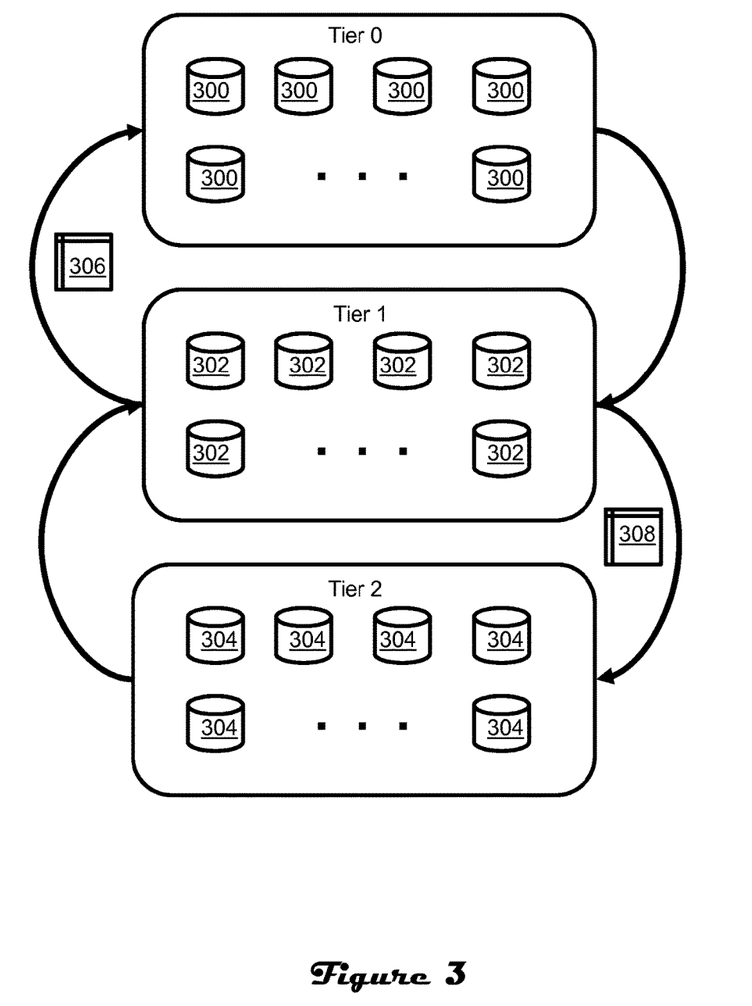
FIG. 3 illustrates tiered storage.

Referring to FIGS. 2 and 3, the storage pools $208_1$ through $208_n$ may be organized into different hierarchical tiers. A data storage system typically includes various logical data storage constructs, but data is ultimately stored on physical storage devices. Different types of physical storage devices have different performance characteristics and different costs. In a tiered storage system each tier is associated with a particular type of physical storage device. Physical storage devices which are capable of relatively faster response times are generally more costly than devices characterized by slower response times. The tiered storage system balances storage cost and storage performance by utilizing different types of storage devices and selectively storing data at the different tiers to achieve desired levels of system performance, cost and capacity. For example, the physical storage devices may include high-speed flash (EFD) arrays 300 at tier 0, Fibre Channel arrays 302 at tier 1, and SATA arrays 304 at tier 2. Tier 0 is used to store sets of data (extents) which are "hot." In particular, the highest ranked extents of storage are selected for storage at tier 0 because it exhibits the best access time. Tier 1 is used to store extents which are "warm." In particular, the next-highest ranked (after tier 0) extents of storage are selected for storage at tier 1. The remaining extents are stored at tier 2. In general there will be greater storage capacity at tier 2 than at tier 1, and greater storage capacity at tier 1 than at tier 0. The number of tiers, types of storage devices used at the tiers, and capacity of the tiers is selected to achieve a particular performance, capacity and cost profile at the system level. A wide variety of storage devices and numbers of tiers might be utilized, and the illustrated example is simplified for ease of understanding so it should not be viewed as limiting the invention.

One aspect of selecting a tier at which to store a particular extent of data is activity. In particular, IO activity associated with an extent 306 can prompt promotion of the extent to a higher tier. Conversely, lack of IO activity associated with an extent 308 can prompt demotion of the extent to a lower tier. Statistical analysis tools are used to monitor activity on a per-extent basis over time and prompt movement or copying of data between tiers based on the level of IO activity. Prompting data movement between tiers in response to activity can generally be implemented by the storage array.

Referring to FIGS. 1 through 3, another aspect of selecting a tier at which to store a particular extent of data is hinting. A hint 120 includes information which is indicative of policy, anticipated activity/inactivity, or both, in order to prompt data placement or movement between tiers in anticipation of activity. For example, a particular extent or type of data may be associated with a particular tier based on performance requirements, importance, or other policies that cause the data to be stored at a particular tier even when idle. Further, calculations may be made to predict whether and when a particular extent of data is likely to be the subject of an IO in order to prompt promotion or demotion of the data. For example, the host may utilize algorithms to recognize data access patterns and prompt the storage array with a hint to promote certain data by moving or copying that data to a higher storage tier if the calculations indicate that the data will be accessed in the near future or at some particular time (e.g., week, day, hour, minute etc.). Similarly, data that is not anticipated to be accessed during some interval of time might be demoted during that interval. Generating hints to prompt data movement between tiers in anticipation of activity is generally implemented outside the storage array, e.g., by the host.

Figure 4:
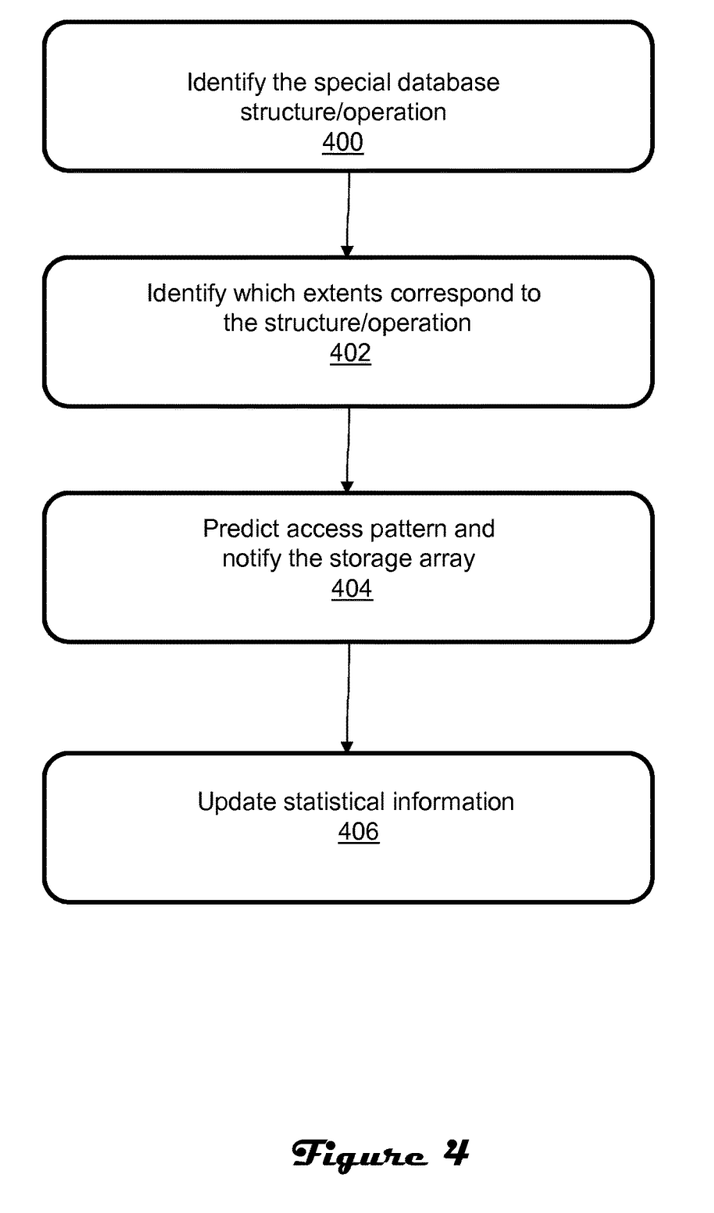
FIG. 4 illustrates a general solution for providing hints associated with identifiable database structures.

Referring to FIG. 4, the inventors have recognized that activity and extents associated with certain types of database operations and structures are difficult to recognize, thereby complicating hint generation. For example, some database structures and operations cause the database to produce activity in different storage extents each time they are utilized, even though the same logical activity may be performed each time. Examples of problematic operations and structures include but are not limited to drop/recreate operations, flip flop tables, view switch, and partition tables. A general solution to this problem utilizes statistical and other information at the database structure level to generate hints. The first step 400 is to identify the special database structure or operation. A database monitoring tool can provide historical information on the database data dictionary. This historical information is searched to identify predefined types of structures and operations based on profiles. More particularly, the historical information includes snapshots of the database data dictionary at different points of time, and each type of structure and operation is characterized by one or more patterns that are utilized by a search function. Pattern matches identified by searching through the snapshots are indicative of occurrences of corresponding structures and operations. The second step 402 is to identify a set of extents which correspond to the identified special structure or operation. This may include determining how the location of the data associated with the structure or operation changes over time, e.g., where each iteration produces a new set of extents which may differ from earlier sets of extents. Different structures and operations may be characterized by different changes of data location and different relationships between currently active extents and previously active extents. Step 404 is to predict an access pattern and notify the storage array. This step can include generating a hint which describes expected activity associated with the new set of extents (or a new set of extents not yet active) based on previous monitoring. The hint is provided to the storage array. The next step 406 is update statistical information associated with the identified structure or operation. This may include associating statistical information concerning activity of earlier sets of extents with the new set of extents. One benefit of this step is that data in the new set of extents can be moved to an appropriate tier before it becomes active, rather than being responsively promoted after it becomes active. Knowledge gained in this manner can be incorporated into other pattern identification mechanisms.

Figure 5:
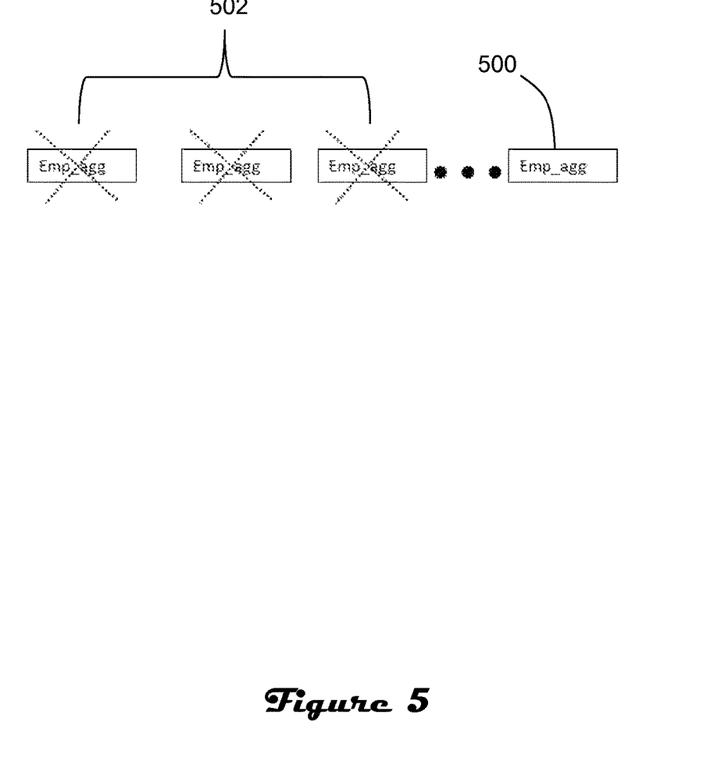
FIG. 5 illustrates a drop/recreate operation.

Referring to FIGS. 4 and 5, hints can be generated in association with a drop/recreate operation. Sometimes an application needs to recreate a table with a new set of data. This is a common feature in cases where the user creates aggregative tables that need to be rebuilt in order to accurately represent the data in the table from which they were derived. The re-created table 500 is located on a new set of blocks. A drop/recreate operation can be identified in step 400 by searching for a list of dropped tables 502 and one active table 500 with the same name (Emp_agg in the illustrated example). In order to identify which extents correspond to the activity in step 402 a search is performed every time a new table is created in order to identify the extents associated with the new table. The time at which the drop/recreate operation occurs is stored as a statistic in order to facilitate generation of the hint for the storage array in step 404. For example, it may be determined that the drop/recreate operation occurs at predictable time intervals, or in association with other monitor able precursor conditions. In order to associate statistical information concerning activity of earlier sets of extents with the new set of extents in step 406 all activity associated with the table, including the active instance 500 and all of its old instances 502, is considered as one object.

Figure 6:
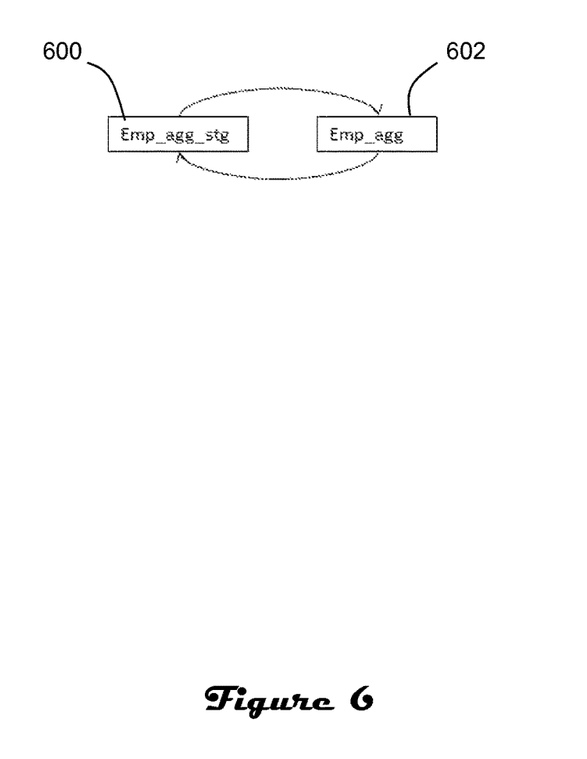
FIG. 6 illustrates flip flop tables.

Referring to FIGS. 4 and 6, hints can be generated in association with flip flop tables. Flip flop tables are corresponding pairs of tables that represent a single logical table. The flip flop tables contain the same set of data but toggle between active and idle states such that only one table of the pair of corresponding flip flop tables is actively used at any given point in time. In other words, one of the tables 602 is active while the other table 600 is idle. This type of structure is used, for example, where the logical table is being accessed constantly so it is undesirable for the table to be inaccessible at any point in time. The idle table (aka staging table) of the pair is sometimes considered as "being filled" because it is updated while idle. Flip flop tables present two different identifiable operational modes. In particular, there is a first mode where the idle table is being created/updated and a second mode where the active table being used. Flip flop tables can be identified in step 400 by searching for a pattern of two tables 600, 602 that repeatedly change their names between the same two values at corresponding points in time. For example, it can be recognized that at a first time a first table is named emp1 and a second table is named emp2, and at a second time the first table is named emp2 and the second table is named emp1. It can also be recognized that the tables change between these names at predetermined intervals of time. In order to identify which extents correspond to the flip flop tables in step 402 the system identifies the extents associated with the newly active table after each change of state. It is also possible that both tables are active but have different roles which are exchanged with every flip flop operation (state change). In this case one of the roles is selected to indicate the active table, e.g., a table being used for reports and being part of batch processing. Step 404 includes generating a hint based on the identified extents and interval of time at which the flip flop operations occur. In the case of flip flop tables step 406 includes replacing the statistics on two sets of extents because separate sets of extents represent the different tables.

Figure 7:
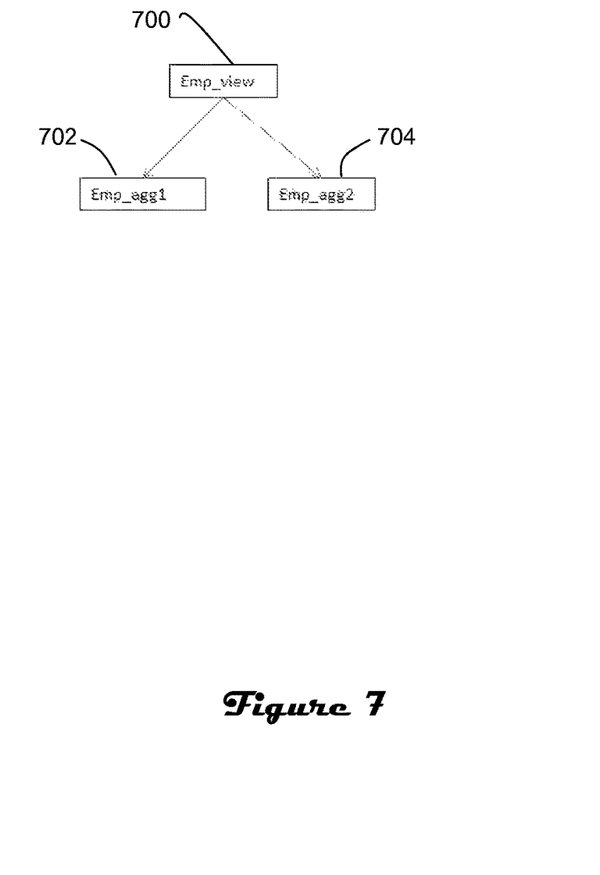
FIG. 7 illustrates a view switch operation.

Referring to FIGS. 4 and 7, hints can be generated in association with a view switch operation. The view switch operation is a view function 700 that points to different tables 702, 704 at different points in time. The table being pointed to at any given time is considered the active table at that point of time, and this condition typically changes at regular intervals of time. For example, the operation could point to table 702 (Emp_agg1) during a first time interval, then to table 704 (Emp_agg2) for a second time interval, then back to Emp_agg1 for a third time interval, etc., where the intervals are equal or at least predictable. View switch can be identified in step 400 by recognizing that view text changes at fixed intervals of time. Suspected occurrences are verified by parsing the view statement text (some database monitoring tools include parsing capabilities) and identifying that the table being accessed also changes at the fixed intervals of time. In order to identify which extents correspond to the view switch in step 402 the system identifies the extents associated with the newly active table after each change of pointing. Step 404 includes generating a hint based on the identified extents and intervals of time at which the view switch operation occurs. In the case of view switch operations step 406 includes replacing the statistics on two sets of extents because separate sets of extents represent the different tables. Further, for each extent there may be a first set of statistics associated with an active interval and a second set of statistics associated with an inactive interval, based on the time of the view switch. The sets of statistics for inactive intervals of multiple tables may be joined as a single set of statistics. Similarly, the sets of statistics for inactive intervals of multiple tables may be joined as a single set of statistics.

Figure 8:
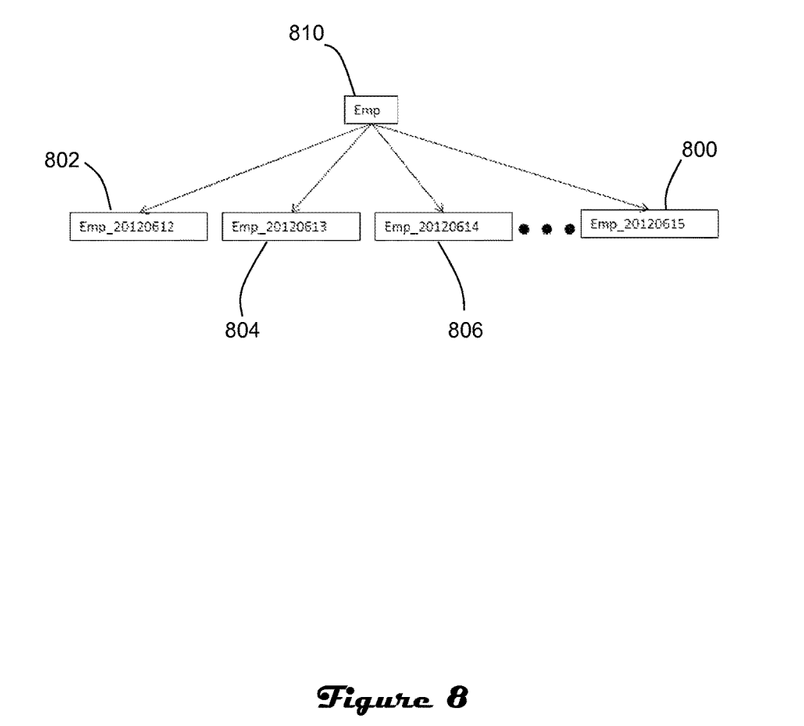
FIG. 8 illustrates a partition table.

Referring to FIGS. 4 and 8, hints can be generated in association with a partition table 810. For a partition table which is partitioned by time, e.g., dates associated with daily/weekly/monthly partitions, different partitions are accessed differently. The partitions that represent more recent times/dates, e.g., partition 800, will be accessed more frequently than partitions that represent less recent times/dates, e.g. partition 802. Consequently, different patterns can be observed on different dates. In order to identify the structure in step 400 every table can be defined as a partition and a search performed to identify date ranged partitions. Identifying the extents in accordance with step 402 is more complicated because although new partitions are being created on a regular basis, those partitions might serve different functions. It is possible that a partition responsible for last week is currently active, and the partition responsible for the week before might be inactive, less active, have the same amount of activity, or even be more active than the most recent partition. Partitions can be defined by their distance in time from the current date. An indication of activity is identified for each partition. The illustrated partition table 810, for example, would be identified as being partitioned daily. The system also identifies that at any given time only the three most recent partitions are active. The system can then determine that the partition containing yesterday's data (partition 806) is associated with 50% of the activity, the partition containing the day before yesterday's data (partition 804) is associated with 30% of the activity, and the partition containing the data of the previous day (partition 802) is associated with 20% of the activity. Consequently, step 402 can include repeatedly (e.g., each day) identifying the three most recent partitions and the current locations of the corresponding extents in storage. In order to notify the storage array in step 404 separate hints may be provided for each of the three partitions. In the case of partition tables step 406 includes updating the statistical information in accordance with the identified time intervals, e.g., daily in the illustrated example. This includes copying the activity from the most recent period to the previous period, copying the activity from the previous period to the period before that, and so on.

While the invention is described through the above examples, it will be understood by those of ordinary skill in the art that a wide variety of modifications to and variations of the illustrated embodiments may be made without departing from the inventive concepts herein disclosed. Moreover, while the embodiments are described in connection with various illustrative structures, one skilled in the art will recognize that the system may be embodied using a wide variety of specific structures. Accordingly, the invention should not be viewed as limited except by the scope and spirit of the appended claims.

What is claimed is:

1. A computer program stored on a non-transitory computer readable medium comprising:
   logic which identifies a defined database structure or operation which does not prompt access of a consistent group of extents each time it is utilized;

logic which identifies a set of extents which correspond to the identified structure or operation; and logic which predicts activity associated with the identified extents and provides a corresponding hint to a storage array.

2. The computer program of claim 1 including logic which updates statistical information associated with the identified structure or operation.

3. The computer program of claim 1 wherein the logic which identifies the defined database structure or operation searches for patterns in historical snapshots of a database data dictionary.

4. The computer program of claim 1 including logic which identifies changes of location of the extents over time.

5. The computer program of claim 2 including logic which associates statistical information related to newly active extents with statistical information related to corresponding previously active extents.

6. The computer program of claim 1 wherein the operation is a drop/recreate operation.

7. The computer program of claim 1 wherein the structure is a flip flop table.

8. The computer program of claim 1 wherein the operation is a view switch operation.

9. The computer program of claim 1 wherein the structure is a partition table.

10. Apparatus comprising:

a network device in communication with a storage array, the network device including non-transitory computer-readable memory and processing hardware for storing and operating logic which:

identifies a defined database structure or operation which does not prompt access of a consistent group of extents each time it is utilized;

identifies a set of extents which correspond to the identified structure or operation; and predicts activity associated with the identified extents and provides a corresponding hint to the storage array.

11. The apparatus of claim 10 wherein the logic updates statistical information associated with the identified structure or operation.

12. The apparatus of claim 10 wherein the logic identifies the defined database structure or operation by searching for patterns in historical snapshots of a database data dictionary.

13. The apparatus of claim 10 wherein the logic identifies changes of location of the extents over time.

14. The apparatus of claim 11 wherein the logic associates statistical information related to newly active extents with statistical information related to corresponding previously active extents.

15. The apparatus of claim 10 wherein the operation is a drop/recreate operation.

16. The apparatus of claim 10 wherein the structure is a flip flop table.

17. The apparatus of claim 10 wherein the operation is a view switch operation.

18. The apparatus of claim 10 wherein the structure is a partition table.

* * * * *